United States Patent
Kaltenbach et al.

(10) Patent No.: US 9,227,623 B2
(45) Date of Patent: Jan. 5, 2016

(54) HYBRID DRIVE OF A MOTOR VEHICLE AND METHOD FOR OPERATING SAME

(71) Applicant: ZF Friedrichshafen AG, Friedrichshafen (DE)

(72) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/366,598

(22) PCT Filed: Nov. 5, 2012

(86) PCT No.: PCT/EP2012/071795
§ 371 (c)(1),
(2) Date: Jun. 18, 2014

(87) PCT Pub. No.: WO2013/091969
PCT Pub. Date: Jun. 27, 2013

(65) Prior Publication Data
US 2014/0349810 A1 Nov. 27, 2014

(30) Foreign Application Priority Data

Dec. 21, 2011 (DE) .......................... 10 2011 089 466

(51) Int. Cl.
*F16H 37/06* (2006.01)
*F16H 3/08* (2006.01)
(Continued)

(52) U.S. Cl.
CPC ................ *B60W 20/10* (2013.01); *B60K 6/48* (2013.01); *B60K 6/547* (2013.01); *B60W 10/02* (2013.01);
(Continued)

(58) Field of Classification Search
USPC ....................... 74/661, 665 A, 330
See application file for complete search history.

(56) References Cited

U.S. PATENT DOCUMENTS 8,075,436 B2 * 12/2011 Bachmann ........................ 475/5
8,684,875 B2 * 4/2014 Kaltenbach et al. ............... 475/5
(Continued)

FOREIGN PATENT DOCUMENTS

DE 198 50 549 A1 4/2000
JP 2010 179868 A 8/2010
WO 2010/007291 1/2010

OTHER PUBLICATIONS

Berger, R. et al., ESG—Elektrisches Schaltgetriebe, ATZ Automobiltechnische Zeitschrift, Vieweg Publishing, Wiesbaden DE, vol. 107, No. 6, Jun. 1, 2005, pp. 488-493, XP001519133, ISSN: 0001-2785.

(Continued)

*Primary Examiner* — Ha D Ho
(74) *Attorney, Agent, or Firm* — Brinks Gilson & Lione (57) ABSTRACT

A hybrid drive of a motor vehicle has an internal combustion engine, an electric machine, and a transmission. The transmission is a multi-stage shifting transmission including two subtransmissions, each of which has a separate input shaft and a common output shaft. The first input shaft of a first subtransmission can be coupled and decoupled to the internal combustion engine. The second input shaft of a second subtransmission is rigidly coupled to the electric machine. Both input shafts can be coupled selectively to the common output shaft via form-locking shift elements. The first input shaft can be attached to multiple clutches in such a way that when a first friction-locking or form-locking clutch and a second friction-locking clutch connected in series are both engaged, the internal combustion engine is coupled to the first input shaft and to the first subtransmission.

20 Claims, 2 Drawing Sheets

(51) Int. Cl.
*B60W 20/00* (2006.01)
*B60K 6/48* (2007.10)
*B60K 6/547* (2007.10)
*B60W 10/02* (2006.01)
*B60W 10/08* (2006.01)
*B60W 10/113* (2012.01)
*B60W 10/06* (2006.01)
*F16H 3/097* (2006.01)
*F16H 3/093* (2006.01)

(52) U.S. Cl.
CPC ............... *B60W 10/06* (2013.01); *B60W 10/08* (2013.01); *B60W 10/113* (2013.01); *B60W 20/00* (2013.01); *B60Y 2300/429* (2013.01); *B60Y 2400/421* (2013.01); *B60Y 2400/424* (2013.01); *F16H 3/097* (2013.01); *F16H 2003/0933* (2013.01); *F16H 2200/0056* (2013.01); *Y02T 10/6221* (2013.01); *Y10S 903/902* (2013.01); *Y10T 74/19051* (2015.01); *Y10T 477/26* (2015.01)

(56) References Cited

U.S. PATENT DOCUMENTS

| | | | |
|---|---|---|---|
| 8,961,345 B2* | 2/2015 | Kaltenbach et al. | 475/5 |
| 2003/0045389 A1* | 3/2003 | Kima | 475/5 |
| 2010/0282531 A1 | 11/2010 | Janssen | |

OTHER PUBLICATIONS

International Search Report issued Jan. 1, 2013 in International Application No. PCT/EP2012/071795.

International Search Report and Written Opinion from corresponding International Patent Application PCT/EP2012/071795, dated Jan. 25, 2013 (German Language).

German Office Action for DE 10 2011 089 466.7, dated Dec. 2, 2013 (German Language), including translation of p. 6.

* cited by examiner

HYBRID DRIVE OF A MOTOR VEHICLE AND METHOD FOR OPERATING SAME

This application is a filing under 35 U.S.C. §371 of International Patent Application PCT/EP2012/071795, filed Nov. 5, 2012, and claims the priority of DE 10 2011 089 466.7, filed Dec. 21, 2011. These applications are incorporated by reference herein in their entirety.

BACKGROUND

The invention relates to a hybrid drive for a motor vehicle. Moreover, the invention relates to methods for operating a hybrid drive of this type.

DE 198 50 549 A1 disclosed a hybrid drive for a motor vehicle, wherein the hybrid drive comprises an internal combustion engine, an electric machine and a transmission designed as a double clutch transmission. The double clutch transmission of the hybrid drive disclosed in DE 198 50 549 A1 has two subtransmissions, each of which has a separate input shaft and a common output shaft, wherein, according to this prior art, a friction-locking clutch is allocated to each input shaft, for coupling the internal combustion engine to the respective input shaft of the respective subtransmission. The subtransmissions of the double clutch transmission according to DE 198 50 549 A1 has form-locking shift elements, by means of which the two input shafts can be selectively coupled to the common output shaft. An electric machine is coupled to at least one input shaft of at least one subtransmission.

Based on this, the present embodiments of the invention address the objective of creating a novel hybrid drive for a motor vehicle and methods for operating a hybrid drive of this type.

SUMMARY

This objective shall be attained by means of a hybrid drive according to the claims. According to the embodiments of the invention, the first input shaft is attached to multiple clutches in such a way that when a first friction-locking or form-locking clutch and a second clutch connected in series between the first clutch and the first subtransmission are both engaged, the internal combustion engine is coupled to the first input shaft and the first subtransmission. Whereas when at least one of the clutches is disengaged, the internal combustion engine is decoupled from the first input shaft and from the first subtransmission. The second input shaft is attached to a form-locking shift element in such a way that when the same is engaged the electric machine is coupled to a shaft portion that extends between the clutches.

With the use of a single electric machine and thus relinquishing a second electric machine, the present disclosure based hybrid drive makes it possible to use a plurality of hybrid functions, for example, purely electrical driving without drag losses at a disengaged clutch, active synchronization of at least some shift elements by means of the electric machine, and starting the internal combustion engine by means of the electric machine when the motor vehicle is at a standstill. Additional functions include starting the internal combustion engine by means of the electric machine during purely electrical driving without interruption of tractive force, start-up or creep drive from a generator mode of the electric machine, without a delay, and accordingly, a charging mode of the electric machine, execution of power shifting when driving with the internal combustion engine utilizing the electric machine as a power-shifting element, and execution of power shifting during a purely electrical driving mode, optionally with simultaneous start-up of the internal combustion engine. Furthermore, boosting and recuperation can be provided as hybrid functions.

The majority of these functions can also be executed when the first clutch is designed as a form-locking clutch. However, some of the functions require that the first clutch is designed as a friction-locking clutch.

The present disclosure includes methods for operating a hybrid drive of this type.

BRIEF DESCRIPTION OF THE DRAWINGS

Further developments of the embodiments of the invention can be derived from the sub-claims and the following description. Embodiments of the invention are explained in greater detail, without being limited thereto, by means of the drawings. It is shown:

DETAILED DESCRIPTION

Figure 1:
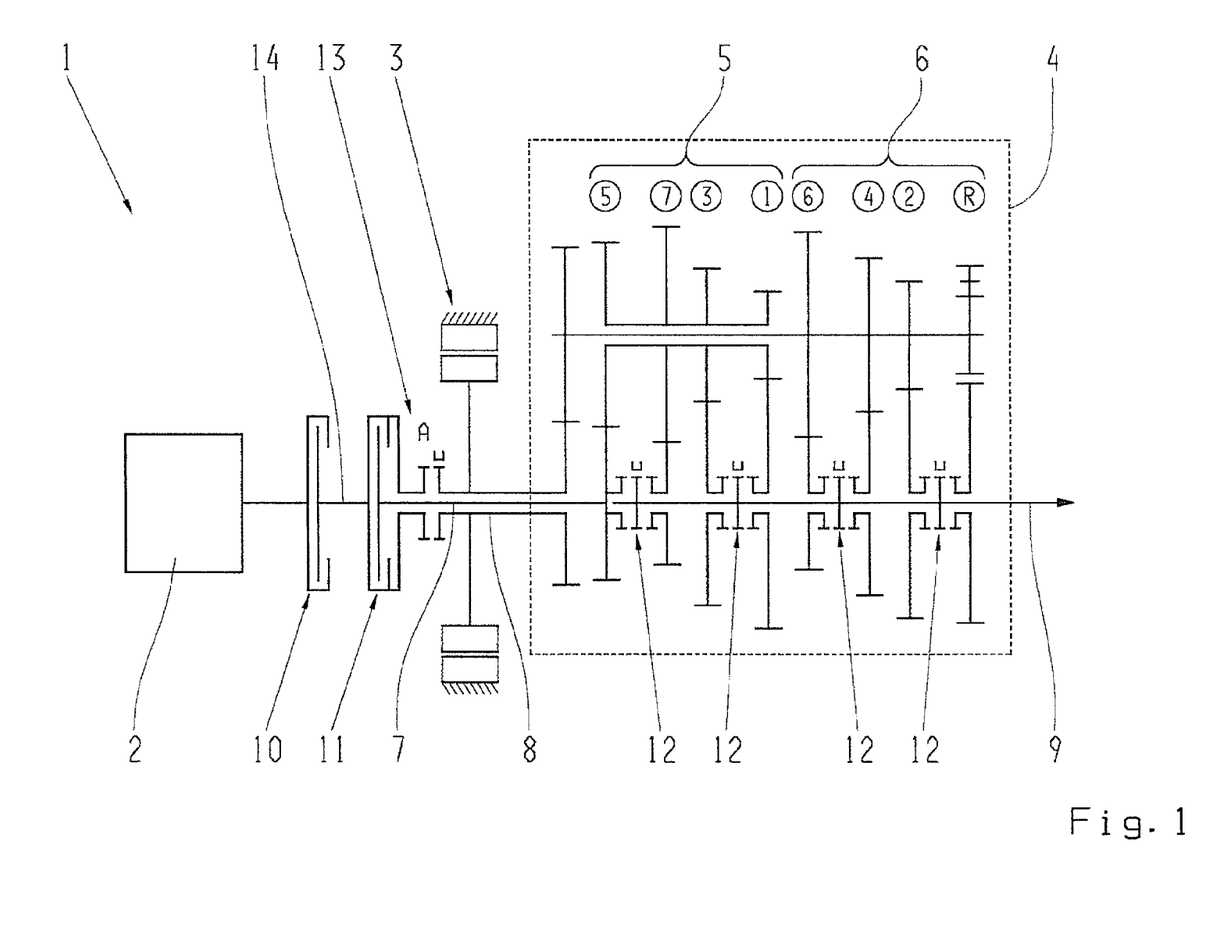
FIG. 1 a diagram of an example embodiment hybrid drive of a motor vehicle.
Figure 2:
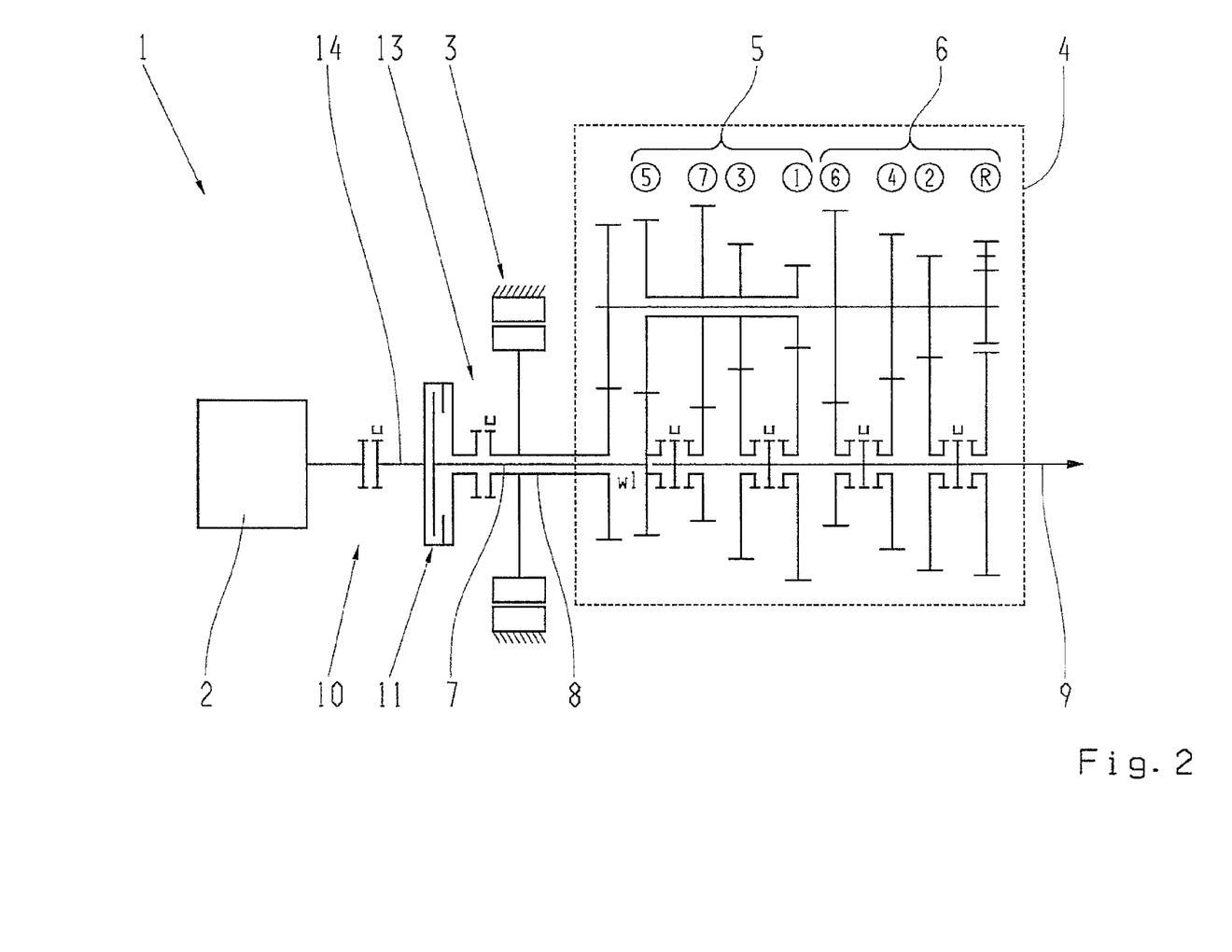
FIG. 2 another diagram of an example embodiment hybrid drive of a motor vehicle.

FIGS. 1 and 2 show embodiments of an invention-based hybrid drive 1 of a motor vehicle, wherein the hybrid drive 1 comprises an internal combustion engine 2, an electric machine 3 and a transmission 4.

The transmission 4 is designed as a multi-stage shifting transmission having two subtransmissions 5 and 6, wherein the two subtransmissions 5 and 6 each have a separate input shaft 7 or 8, respectively, and a common output shaft 9.

In the embodiment shown in FIG. 1, the first subtransmission 5 provides the forward gears "1," "3," "5," and "7". In the embodiment shown, the second subtransmission 6 provides the forward gears "2," "4," and "6," and the reverse gear "R".

According to FIG. 1, the transmission 4, having the two subtransmissions 5 and 6, has numerous form-locking shift elements combined to form shifting groups 12, by means of which each of the two input shafts 7 and 8 of the two subtransmissions 5 and 6 can be selectively coupled to the output shaft 9 of the transmission 4, wherein the output shaft 9 of the transmission 4 acts on an output drive.

At this point, it should be noted that in the embodiment shown the two input shafts 7 and 8 of the two subtransmissions 5 and 6 are disposed coaxially to one another. At the same time, the electric machine 3 engages at the external input shaft 8 of the second subtransmission 6, namely in FIG. 1 directly. However, it is also possible to interpose between this input shaft 8 of the second subtransmission 6 and the electric machine 3 a constant transmission ratio.

The combustion motor 2 can be coupled to the first input shaft 7 and thus to the first subtransmission 5, as well as uncoupled therefrom, whereas the electric machine 3 is rigidly coupled to the second input shaft 8 and thus to the second subtransmission 6.

The first input shaft 7 of the first subtransmission is attached to multiple clutches 10, 11, namely two clutches connected in series, wherein a first clutch 10 is interposed between the internal combustion engine 2 and the second clutch 11, and the second clutch 11 is interposed between the first clutch 10 and the first subtransmission 5.

The first clutch 10 involves either a friction-locking clutch 10 (see FIG. 1) or a form-locking clutch (see FIG. 2). The second clutch 11 involves a friction-locking clutch 11.

When both series-connected clutches 10 and 11 are engaged, the internal combustion engine 2 is coupled to the first input shaft 7 and thus to the first subtransmission 5. However, when at least one clutch 10 and 11 is disengaged, the internal combustion engine 2 is decoupled from the first input shaft 7 and thus from the first subtransmission 5.

The second input shaft 8 of the subtransmission 6 is not attached to a friction-locking clutch, but to a form-locking shift element 13, namely in such a way that when the form-locking shift element 13 is engaged the electric machine 3 is connected with a shaft portion that extends between the clutches 10 and 11 and that is coupled to the first input shaft 7 when the second clutch 11 is engaged, whereas the electric machine 3 is decoupled from said shaft portion 14 when the form-locking shift element 13 is disengaged.

When the form-locking shift element 13 and the first clutch 10 are both engaged and the second clutch is disengaged 11, the electric machine 3 is coupled to the internal combustion engine 2, and thus the internal combustion engine 2 together with the electric machine 3 are coupled to the second input shaft 8 of the second subtransmission 6, whereas they are decoupled from the first input shaft 7 of the first subtransmission 5. When the form-locking shift element 13 and the second clutch 11 are both engaged and the first clutch 10 is disengaged, the electric machine 3 is coupled to the first input shaft 7 of the first subtransmission, as well as to the second input shaft 8 of the second subtransmission 6. When both clutches 10, 11 are engaged, the internal combustion engine 2 is coupled to the first input shaft 7 and thus to the first subtransmission 5, wherein when the shift element 13 is engaged the electric machine 3 is coupled to both input shafts 7, 8 of the subtransmissions 5, 6, and when the shift element 13 is disengaged the electric machine is coupled exclusively to the second input shaft 8 of the second subtransmission 6.

The present disclosure based hybrid drive allows for purely electrical driving without drag losses at a disengaged clutch, even when the first clutch 10 is friction-locking. Preferably, a neutral setting is engaged in the first subtransmission 5, the shift element 13 is disengaged, a gear is engaged in the second subtransmission 6, wherein in the case of this purely electrical driving the shifting setting of both clutches 10 and 11 can be optionally selected. The electric machine 3 then drives the motor vehicle via the second subtransmission 6, the clutches 10 and 11 do not turn, thus preventing drag losses during pure electrical driving.

Furthermore, with the present disclosure based hybrid drive 1, shift elements can be actively synchronized by means of the electric machine 3. For example, it is possible in a speed-controlled operation of the electric machine to actively synchronize via said electric machine 3 the shift elements of the second subtransmission 6 that are combined into the shifting groups 12.

The shift elements of the first subtransmission that are combined into the shifting groups 12 and the form-locking shift element 13 cannot be synchronized via the electric machine when the electric machine 3 is used as traction drive. Instead, the same are synchronized in different ways, for example, via a speed control of the internal combustion engine 2 when the first clutch 10 is engaged or the second, friction-locking clutch 11 is partially engaged.

When the motor vehicle is at a standstill, the present disclosure based hybrid drive allows for a start-up of the internal combustion engine 2 of the hybrid drive, namely a direct start of the internal combustion engine 2, as well as a dynamic start of the internal combustion engine 2. In a direct start of the internal combustion engine 2 of the hybrid drive the shift element 13 is being engaged, in the second subtransmission 6 a neutral setting is being engaged. Furthermore, a neutral setting is engaged in the first subtransmission 5 and/or the second clutch 11 is disengaged. The first clutch 10 is engaged. The electric machine 3 then actuates the internal combustion engine 1 for dragging the same. This direct start can be used when the first clutch 10 is friction-locking or form-locking.

For providing a dynamic start of the internal combustion engine 2 when the motor vehicle is at a standstill, the shift element 13 is also engaged and a neutral setting is engaged in the second subtransmission 6. Furthermore, a neutral setting is engaged again in the first subtransmission 5 and/or the second clutch 11 is disengaged. In addition, the first, in this case inevitably friction-locking clutch 10 is first disengaged, wherein when the friction-locking clutch is disengaged the electric machine 3 is accelerated to a defined pulse start speed, in order to engage the first friction-locking clutch 10 and thus start the internal combustion engine 2 via a dynamic start when reaching said defined pulse start speed.

Furthermore, with the present disclosure based hybrid drive 1, it is possible to start the internal combustion engine 2 from purely electrical driving without interruption of tractive force, even at low driving speeds. For this purpose, during purely electrical driving, the second, friction-locking clutch 11 is brought to a slipping state by lowering the transference capacity of the same, and at low driving speeds the speed of the electric machine 3 is increased, optionally via the first subtransmission 5 when a gear is engaged in the first subtransmission 5, when the second subtransmission 6 is in neutral setting, when the form-locking shift element 13 is engaged, when the first, in this case inevitably friction-locking clutch 10 is disengaged and when the second, friction-locking clutch 11 is engaged. By engaging the first, friction-locking clutch 10, the internal combustion engine 2 can be started, wherein the second, friction-locking clutch 11 provides a slippage decoupling because the output drive torque depends solely on the transference capacity of the second clutch 11. As a result, a comfortable start-up of the internal combustion engine 2 can be ensured. Subsequently, the second clutch 11 can be synchronized and engaged under load.

Furthermore, with the hybrid drive 1 according to the embodiments of the invention, a start-up without delays is possible by starting from a generator mode of the electric machine 3, and accordingly, a charging mode of the electric machine 3. For this purpose, in generator mode or charging mode of the electric machine 3, the form-locking shift element 13 is engaged, a neutral setting is engaged in the second subtransmission 6 and in the first subtransmission 5 a starting gear is engaged. Furthermore, the first clutch 10 is engaged and the second clutch 11 is disengaged or engaged maximally as far as the point of contact. In this case, the electric machine 3 operates in generator mode for generating an electrical power, for example, for an on-board power supply or for charging an electrical energy storage device of the motor vehicle. From this charging condition of the electric machine 3, a start-up or creep drive can be realized without delays at any time by further engaging the second clutch 11. This function can be used when the first clutch 10 is friction-locking or when the first clutch 10 is form-locking.

Furthermore, in the present disclosure based hybrid drive, or in a motor vehicle comprising such a hybrid drive, it is possible to execute power shifting when utilizing the electric machine 3 as a power shifting element. For example, during a load-free gear change of the first subtransmission 5 when the form-locking shift element 13 is disengaged, it is possible via a gear in the second subtransmission to provide an output drive torque of the motor vehicle with the electric machine 3. During such a gear shift in the first subtransmission 5, one of the clutches 10 or 11 is optionally disengaged, wherein it is preferred when the second, friction-locking clutch 11 is disengaged because in this case a lower mass of inertia has to be synchronized.

Power shifting in the second subtransmission 6 utilizing the electric machine 3 as power shifting element is only executed when the internal combustion engine 2 provides an output drive torque via the first subtransmission 1.

In detail, for executing a gear change from a first gear of the first subtransmission 5 to a target gear of the second subtransmission 6, starting with a combustion-engine drive of the motor vehicle when the clutches 10 and 11 are engaged and the form-locking shift elements 13 are disengaged in order to ensure power shifting utilizing the electric machine 3 as power shifting element, the target gear in the second subtransmission 6 is first synchronized via the electric machine 3 and is then engaged. Subsequently, in order to ensure a load transference from the internal combustion engine 2 to the electric machine 3, a load is built up at the electric machine and a load is decreased at the internal combustion engine 2 and optionally at least one of the clutches 10, 11, preferably the second, friction-locked clutch 11, is disengaged. Subsequently, the first gear is disengaged in the first subtransmission 5 and the form-locking shift element 13 is synchronized and engaged. Thereafter, a load transference from the electric machine 3 back to the internal combustion engine 2 is executed by decreasing a temporally overlapping load at the electric machine 3 and building up a load at the internal combustion engine 2 and optionally engaging the clutch or each clutch 10, 11. This function can be used when the first clutch 10 is friction-locking or when the first clutch 10 is form-locking.

This concludes the gear change from the first gear of the first subtransmission 5 to a target gear of the second subtransmission 6, wherein subsequently the distribution of a requested driving torque between internal combustion engine 2 and electric machine 3 takes place according to the requirements of an operating strategy.

For example, the above-mentioned gear change from the first gear of the first subtransmission 5 to the target gear of the second subtransmission 6 can involve a gear change of the transmission 4 from the forward gear "1" to the forward gear "2" or from the forward gear "3" to the forward gear "4" or from the forward gear "5" to the forward gear "6".

Based on a combustion-engine drive of the motor vehicle when the clutches 10 and 11 are engaged and the form-locking shift elements 13 are engaged, to execute power shifting utilizing the electric machine 3 as power shifting element and ensuring a gear change from a first gear of the second subtransmission 6 to a target gear of the first transmission 5, first a load transference is made from the internal combustion engine 2 to the electric machine 3 by building up a temporally overlapping load at the electric machine 3, decreasing a load at the internal combustion engine 2, engaging the form-locking shift element 13 and optionally engaging at least one of the clutches 10, 11, especially the second, friction-locking clutch 11. Subsequently, the target gear of the first subtransmission 5 is synchronized and engaged. Thereafter a load transference from the electric machine 3 back to the internal combustion engine 2 is executed by decreasing a temporally overlapping load at the electric machine 3 and building up a load at the internal combustion engine 2 and optionally engaging the respective clutch 10 and/or 11. Then, optionally the first gear in the second subtransmission 6 can be engaged. This function can be used when the first clutch 10 is friction-locking or when the first clutch 10 is form-locking.

For example, the above-mentioned gear change from the first gear of the second subtransmission 6 to the target gear of the first subtransmission 5 can involve a gear change of the transmission 4 from the forward gear "2" to the forward gear "3" or from the forward gear "4" to the forward gear "5" or from the forward gear "6" to the forward gear "7".

Then, based on a combustion-engine drive of the motor vehicle when the clutches 10 and 11 are engaged and the form-locking shift elements 13 are engaged and power shifting is to be executed utilizing the electric machine 3 as power shifting element from a first gear of the first subtransmission 5 to a target gear of the first subtransmission 5, first an intermediate gear of the second subtransmission is synchronized and engaged. Subsequently, a load transference from the internal combustion engine 2 to the electric machine 3 is executed by building up a temporally overlapping load at the electric machine 3, decreasing a load at the internal combustion engine 2 and optionally disengaging at least one of the clutches 10, 11, preferably at least the second, friction-locking clutch 11. This function can be used when the first clutch 10 is friction-locking or when the first clutch 10 is form-locking. Thereafter, the first gear of the first subtransmission 5 is engaged and the target gear of the first subtransmission 5 is synchronized and engaged. Then, in order to ensure a load transference from the electric machine 3 back to the internal combustion engine 3 a load is decreased temporally overlapping at the electric machine 3 and at the internal combustion engine 2 a load is built up and optionally the respective clutch 10, 11 is engaged. Subsequently, the previously engaged intermediate gear of the second subtransmission 6 can be optionally disengaged. This function can be used when the first clutch 10 is friction-locking or when the first clutch 10 is form-locking.

For example, the above-mentioned gear change from the first gear of the first subtransmission 5 to a target gear of the first subtransmission 5 can involve a gear change from the forward gear "1" to the forward gear "3" or from the forward gear "3" to the forward gear "5" or from the forward gear "5" to the forward gear "7". At the same time, in the second subtransmission 6, the forward gear "2" is engaged as intermediate gear for a gear change from the forward gear "1" to the forward gear "3".

When, starting with an internal combustion engine drive of the motor vehicle when the clutches 10 and 11 are engaged and when the form-locking shift element 13 is engaged, a gear change from the first gear of the second subtransmission 6 to a target gear of the second subtransmission 6 is to be executed, first a load is built up at the electric machine 3, a load is decreased at the internal combustion engine 2, the form-locking shift element 13 is disengaged and optionally at least one of the clutches 10 and 11 is disengaged in order to implement a load transference from the internal combustion engine 2 to the electric machine 3. Subsequently, an intermediate gear of the first subtransmission 5 is synchronized and engaged. Thereafter, a load is decreased at the electric machine 3 and a load is built up at the internal combustion engine and optionally the respective clutch 10 and/or 11 is engaged in order to implement a load transference back to the internal combustion engine 2. Then the first gear of the second subtransmission 6 is disengaged and the target gear of the second subtransmission 6 is synchronized and engaged. Subsequently, in order to ensure a load transference from the internal combustion engine 2 to the electric machine 3, a temporally overlapping load is again built up at the electric machine 3 and a load is decreased at the internal combustion engine 2 and optionally at least one of the clutches 10 and/or 11 is disengaged. Thereafter, the intermediate gear of the first subtransmission 5 is disengaged and the form-locking shift element 13 is synchronized and engaged. Then again, load is transferred from the electric machine 3 back to the internal combustion engine 2 in which a temporally overlapping load is built up at the internal combustion engine 2, a load is decreased at the electric machine 3 and optionally the respective clutch 10 and/or 11 is engaged. This function can be used when the first clutch 10 is friction-locking or when the first clutch 10 is form-locking.

For example, the above-mentioned gear change from the first gear of the second subtransmission 6 to a target gear of the second subtransmission 6 can involve a gear change from the forward gear "2" to the forward gear "4" or from the forward gear "4" to the forward gear "6". At the same time, in the first subtransmission 5, the forward gear "3" is engaged as an intermediate gear for a gear change from the forward gear "2" to the forward gear "4".

Further methods relate to the design of gear changes in a purely electrical operation.

To execute a gear change in the transmission 4, especially traction power upshifting, in a purely electrical operation via the second subtransmission 6 from a first gear of the second subtransmission 6 to a target gear of the first subtransmission, it is assumed that both clutches 10 and 11 are first disengaged and also the form-locking shift element 13 is disengaged. In case the clutches 10 and 11 are first not disengaged, they will both be disengaged. In order to execute traction power upshifting from a first gear of the second subtransmission 6 to a target gear of the first subtransmission 5 in a purely electrical operation, first of all the target gear of the first subtransmission is synchronized and engaged. Subsequently, the form-locking shift element 13 is synchronized and engaged. Thereafter, a load transference takes place via the second clutch 11, in that preferably the transference capacity of the same is continuously increased, namely until the second subtransmission 6 is free of load so as to disengage the first gear of the second subtransmission free of load. Then, the second clutch 11 is synchronized under load and completely engaged. In this way, it is possible to carry out in a purely electrical operation traction power upshifting from the second subtransmission 6 to the first subtransmission 5. A traction power upshifting and a dynamic power downshifting are identical here in terms of the sequence, with only the algebraic signs for the torque being reversed. In an analogous manner, it is possible in a purely electrical operation to carry out a dynamic power downshifting from the second subtransmission 6 to the first subtransmission 5. This function can be used when the first clutch 10 is friction-locking or when the first clutch 10 form-locking.

In order to execute during purely electrical driving and via the first subtransmission 5 a gear change from the first gear of the first subtransmission 5 to a target gear of the second subtransmission 6, when the first clutch 10 is disengaged, when the second clutch 11 is engaged, when the form-locking shift element is engaged, when a first gear of the first subtransmission 5 is engaged and when a neutral setting is established in the second subtransmission 6, the second, friction-locking clutch 11 is first brought to a slipping state by lowering the transference capacity, wherein then the target gear of the second subtransmission 6 is synchronized and engaged. By further lowering the transference capacity of the second clutch 11, the same is completely disengaged so that the load is directed via the second subtransmission 6. Optionally the form-locking shift element 13 is disengaged and then the first gear of the first subtransmission 5 is disengaged. In this way, it is possible to avoid drag losses at the clutches 10 and 11. Preferably, in this way a traction power downshifting is carried out in a purely electrical operation from the first gear of the first subtransmission 5 to the target gear of the second subtransmission 6. Analogously, a dynamic power upshifting can be carried out from the first subtransmission 5 to the second subtransmission 6. This function can be used when the first clutch is friction-locking or when the first clutch is form-locking.

Furthermore, the embodiments of the invention relate to the design of a gear change, namely a traction power upshifting, in the transmission 4 in a purely electrical operation with simultaneous starting of the internal combustion engine 2, wherein the form-locking shift element 13 is disengaged in the initial state, in the second subtransmission 6 a gear is engaged in order to drive in a purely electrical mode via the second subtransmission 6, wherein both clutches 10 and 11, which are here inevitably friction-locking, are preferably disengaged. Subsequently, a target gear is synchronized and engaged in the first subtransmission 5, and then the form-locking shift element 13 is also synchronized and engaged. By continuously increasing the transference capacity of the second, friction-locking clutch 11, a load assumption takes place via the friction-locking clutch 11, namely until the second subtransmission 6 is free of load so that the first gear can be disengaged in the second subtransmission 6 as soon as the same is free of load. Then the second, friction-locking clutch 11 is synchronized under load and temporally overlapping the first, friction-locking clutch 10 is engaged in order to drag the internal combustion engine 2. At the same time, the mass of inertia of the electric machine 3 is used to drag the internal combustion engine 2, wherein the slippage decoupling toward the drive is ensured by means of the second, friction-locking clutch 11. When the internal combustion engine 2 has been dragged to a sufficiently high start speed, the first, friction-locking clutch 10 can be disengaged again so that the internal combustion engine can continue the starting process on its own. Subsequently, the second, friction-locking clutch 11 is further synchronized and then engaged.

It should be noted at this point that the gear allocation of the gears to the subtransmissions 5 and 6 of the transmission 4 can differ from the one shown in FIG. 1. It is therefore not absolutely necessary that the first subtransmission 5 provides odd gears, and the second subtransmission 6 provides the even gears. However, in order to ensure a power shifting capability via the electric machine 3, the gears of the second subtransmission 6, to the input shaft 8 of which the electric machine 3 is engaged, should not be directly adjacent to one another. Preferably, the second subtransmission 6, to the input shaft 8 of which the electric machine 3 is engaged, comprises at least two electrical travel gears by means of which the entire speed range with regard to the electric machine 3 can be covered. Preferably, these are then also used as support gears for gear shifting or gear changes.

During driving operations, the hybrid drive 1 can be operated in such a way that the power flow of the electric machine 3 is only acting via the second subtransmission 6. The internal combustion engine can then be decoupled from the transmission 4 at any time by disengaging the first clutch 10. For subsequently coupling the internal combustion engine again, all gears of the first subtransmission 5 and the current gear of the second subtransmission 6 are available. This is advantageous because the speed of the motor vehicle can change considerably when the internal combustion engine 2 is decoupled, especially during regenerative braking operations so that a lower gear is required for subsequently coupling the internal combustion engine 2 than at the time when the internal combustion engine 2 was decoupled.

As described above, the internal combustion engine 2 can be decoupled from the transmission via the first, friction-locking or form-locking clutch 10. In a first friction-locking clutch 10, it is possible to drag the internal combustion engine 2 from an electric driving mode and to couple the internal combustion engine 2 under load. The internal combustion engine 2 can be coupled with the electric machine 3 via the first clutch 10 and the form-locking shift element 13. When the form-locking shift element 13 is engaged, the internal combustion engine 2 can use the gears of the second subtransmission 6. The electric machine 3 can be coupled to the intermediate shaft 14 via the form-locking shift element 13. When the form-locking shift element 13 is disengaged, electric driving without drag losses at a disengaged, friction-locking clutch can is possible. The internal combustion engine 2 can be coupled to the first subtransmission via the second, friction-locking clutch 11. The interaction of the second, friction-locking clutch 11 and the form-locking shift-element 13 allows for a start-up without a delay from the charging mode of the electric machine 3, slippage decoupling when starting the internal combustion engine 2, purely electric power shifting utilizing the second, friction-locking clutch 11 as power shifting element and starting the internal combustion engine 2 when executing power shifts during electrical driving.

REFERENCE CHARACTERS 1 hybrid drive
2 internal combustion engine
3 electric machine
4 transmission
5 first subtransmission
6 second subtransmission
7 first input shaft
8 second input shaft
9 output shaft
10 form-locking or friction-locking clutch
11 friction-locking clutch
12 shifting group
13 shift element
14 shaft portion

The invention claimed is:

1. A hybrid drive of a motor vehicle comprising an internal combustion engine, an electric machine, and a transmission, wherein the transmission is a multi-stage shifting transmission comprising:
   a first subtransmission comprising a first input shaft; and
   a second subtransmission comprising a second input shaft, said first and second subtransmissions sharing a common output shaft,
   wherein the first input shaft of the first subtransmission is releaseably coupled to the internal combustion engine,
   wherein the second input shaft of the second subtransmission is rigidly coupled to the electric machine,
   wherein the first and second input shafts are selectively coupled to the common output shaft,
   wherein the first input shaft of the first subtransmission is attached to first and second clutches in such a way that when the first clutch and the second clutch, which is connected in series between the first clutch and the first subtransmission, are both engaged, the internal combustion engine is coupled to the first input shaft and to the first subtransmission, whereas when at least one of the first or second clutches is disengaged, the internal combustion engine is decoupled from the first input shaft and from the first subtransmission, and
   wherein the second input shaft of the second subtransmission is attached to a form-locking shift element in such a way that when the form-locking shift element is engaged, the electric machine is coupled to a shaft portion that extends between the first and second clutches.

2. The hybrid drive according to claim 1, wherein when the form-locking shift element and the first clutch are engaged and the second clutch is disengaged, the electric machine is coupled to the internal combustion engine and the internal combustion engine and the electric machine are coupled to the second input shaft of the second subtransmission.

3. The hybrid drive according to claim 1, wherein when the form-locking shift element and the second clutch are engaged and the first clutch is disengaged, the electric machine is coupled to the first input shaft of the first subtransmission, as well as to the second input shaft of the second subtransmission.

4. The hybrid drive according to claim 1, wherein when the first and the second clutches are engaged, the electric machine is coupled to the first input shaft of the first subtransmission, as well as to the second input shaft of the second subtransmission when the form-locking shift element is engaged, and
   wherein the electric machine is coupled to only the second input shaft of the second subtransmission when the form-locking shift element is disengaged.

5. The hybrid drive according to claim 1, wherein the first and second input shafts of the first and second subtransmissions are disposed coaxially to one another.

6. A method for operating a hybrid drive according to claim 1 in order to execute a gear change from a first gear of the first subtransmission to a target gear of the second subtransmission, with the motor vehicle in internal combustion engine driving mode, the first and second clutches are engaged, and the form-locking shift element is disengaged, the method comprising:
   synchronizing and engaging the target gear of the second subtransmission,
   building up a load at the electric machine,
   disengaging the first gear of the first subtransmission,
   synchronizing and engaging the form-locking shift element, and
   decreasing the load at the electric machine and building up a load at the internal combustion engine.

7. A method for operating a hybrid drive according to claim 1 in order to execute a gear change from a first gear of the second subtransmission to a target gear of the first subtransmission, with the motor vehicle in internal combustion engine driving mode, the first and second clutches are engaged, and the form-locking shift element is engaged, the method comprising:
   building up a load at the electric machine,
   decreasing a load at the internal combustion engine,
   disengaging the form-locking shift element,
   synchronizing and engaging the target gear of the first subtransmission,
   decreasing the load at the electric machine, and
   building up the load at the internal combustion engine.

8. A method for operating a hybrid drive according to claim 1 in order to execute a gear change from a first gear of the first subtransmission to a target gear of the first subtransmission, with the motor vehicle in internal combustion engine driving mode, the first and second clutches are engaged, and the form-locking shift element is disengaged, the method comprising:
   synchronizing and engaging an intermediate gear in the second subtransmission,
   building up a load at the electric machine, decreasing a load at the internal combustion engine,
disengaging the first gear of the first subtransmission
synchronizing and engaging the target gear of the first subtransmission,
decreasing the load at the electric machine to ensure a load transference from the electric machine back to the internal combustion engine, and
building up the load at the internal combustion engine.

9. A method for operating a hybrid drive according to claim 1 in order to execute a gear change from a first gear of the second subtransmission to a target gear of the second subtransmission, with the motor vehicle in internal combustion engine driving mode, the first and second clutches are engaged, and the form-locking shift element is engaged, the method comprising:
building up a load at the electric machine,
decreasing a load at the internal combustion engine,
disengaging the form-locking shift element,
synchronizing and engaging an intermediate gear of the first subtransmission,
decreasing the load at the electric machine,
building up the load at the internal combustion engine,
disengaging the first gear of the second subtransmission,
synchronizing and engaging the target gear of the second subtransmission,
building up the load at the electric machine,
decreasing the load at the internal combustion engine, and,
disengaging the intermediate gear of the first subtransmission,
synchronizing and engaging the form-locking shift element,
decreasing the load at the electric machine, and
building up the load at the internal combustion engine.

10. A method for operating a hybrid drive according to claim 1 in order to execute a gear change from a first gear of the second subtransmission to a target gear of the first subtransmission, with the motor vehicle in purely electric driving mode via the second subtransmission, the electric machine is rigidly coupled to the second input shaft, and the first and second clutches are disengaged, the method comprising:
synchronizing and engaging the target gear in the first subtransmission,
synchronizing and engaging the form-locking shift element, and
engaging the second clutch until the second subtransmission is free of load, wherein when the second subtransmission is free of load the first gear of the second subtransmission is disengaged and subsequently the second clutch is engaged.

11. A method for operating a hybrid drive according to claim 1 in order to execute a gear change from a first gear of the first subtransmission to a target gear of the second subtransmission, with the motor vehicle in purely electric driving mode via the first subtransmission, the first clutch is disengaged, the second clutch is engaged, and the form-locking shift element is engaged, the method comprising:
bringing the second clutch to a slipping state,
synchronizing and engaging the target gear of the second subtransmission, and
further disengaging the second clutch.

12. A method for operating a hybrid drive according to claim 1 in order to execute a gear change from a first gear of the second subtransmission to a target gear of the first subtransmission, with the motor vehicle in purely electric driving mode via the second subtransmission, the electric machine is rigidly coupled to the second input shaft, the first and second clutches are disengaged, and the form-locking shift element is disengaged, the method comprising:
starting the internal combustion engine in such a way that the target gear of the first subtransmission is synchronized and engaged and the form-locking shift element is also synchronized and engaged,
engaging the second clutch until the second subtransmission is free of load, wherein with a load-free second subtransmission, the first gear of the second subtransmission is disengaged, and subsequently
synchronizing the second clutch under load while temporally overlapping with dragging the internal combustion engine by engaging the first clutch.

13. A method for operating a hybrid drive according to claim 1, with the motor vehicle in purely electric driving mode via the first subtransmission, the first clutch is disengaged, the second clutch is engaged, and the form-locking shift element is engaged, the method comprising:
starting the internal combustion engine,
bringing the second clutch to a slipping state,
increasing the speed of the electric machine, and
dragging the internal combustion engine by engaging the first clutch.

14. A method for operating a hybrid drive according to claim 1, with the motor vehicle at a standstill, the method comprising:
engaging the form-locking shift element such that the electric machine is in generator mode,
engaging a starting gear in the first subtransmission,
engaging a neutral setting in the second subtransmission,
engaging the first clutch, and
maximally engaging the second clutch up to the point of contact of the second clutch, wherein for a subsequent start-up or creep drive the second clutch is engaged beyond the point of contact.

15. The method for operating a hybrid drive according to claim 6, further comprising:
disengaging at least one of the first or second clutches when synchronizing and engaging the target gear of the second subtransmission, and
engaging the least one of the first or second clutches when building up the load at the internal combustion engine.

16. The method for operating a hybrid drive according to claim 7, further comprising:
disengaging at least one of the first or second clutches when disengaging the form-locking shift element, and
engaging the least one of the first or second clutches when building up the load at the internal combustion engine.

17. The method for operating a hybrid drive according to claim 8, further comprising:
disengaging at least one of the first or second clutches when decreasing a load at the internal combustion engine, and
engaging the least one of the first or second clutches when building up the load at the internal combustion engine.

18. The method for operating a hybrid drive according to claim 9, further comprising:
disengaging at least one of the first or second clutches when disengaging the form-locking shift element,
engaging the least one of the first or second clutches when building up the load at the internal combustion engine, and
disengaging at least one of the first or second clutches when decreasing the load at the internal combustion engine.

19. The method for operating a hybrid drive according to claim 11, further comprising:
 disengaging the form-locking shift element and the first gear of the first subtransmission when further disengaging the second clutch.

20. The method for operating a hybrid drive according to claim 11, further comprising:
 disengaging the first clutch and engaging the second clutch after dragging the internal combustion engine by engaging the first clutch.

* * * * *